United States Patent [19]
Arai

[11] Patent Number: 5,269,867
[45] Date of Patent: Dec. 14, 1993

[54] METHOD FOR PRODUCING OPTICAL DEVICE

[75] Inventor: Takashi Arai, Tokyo, Japan

[73] Assignee: Canon Kabushiki Kaisha, Tokyo, Japan

[21] Appl. No.: 780,992

[22] Filed: Oct. 24, 1991

[30] Foreign Application Priority Data

Oct. 26, 1990 [JP] Japan .................................. 2-286965

[51] Int. Cl.⁵ ...................... B32B 31/00; B29D 11/00
[52] U.S. Cl. .............................. 156/275.5; 156/275.7; 264/1.4
[58] Field of Search ................ 264/1.4, 22; 156/275.5, 156/275.7, 272.2

[56] References Cited

U.S. PATENT DOCUMENTS

| | | | |
|---|---|---|---|
| 4,440,699 | 4/1984 | Smid et al. | 264/1.4 |
| 4,534,915 | 8/1985 | Neefe | 264/1.4 |
| 4,702,574 | 10/1987 | Bawa | 264/1.4 X |
| 5,110,514 | 5/1992 | Soane | 264/1.4 X |

FOREIGN PATENT DOCUMENTS

60-56544  4/1985 Japan.
60-243601 12/1985 Japan.

*Primary Examiner*—David A. Simmons
*Assistant Examiner*—Chester T. Barry
*Attorney, Agent, or Firm*—Fitzpatrick, Cella, Harper & Scinto

[57] ABSTRACT

An optical element such as a lens is produced in a manner that a resin is supplied to a mold member having a transfer face for forming an optically functional face, a glass blank is placed on the resin, and a curing energy is irradiated to the resin so as to be uniformly incident on the resin, thereby preventing stress being nonuniformly distributed or shrinkage on the resin surface upon curing.

1 Claim, 6 Drawing Sheets

METHOD FOR PRODUCING OPTICAL DEVICE

BACKGROUND OF THE INVENTION

1. Field of the Invention

The present invention relates to a method for producing a lens with ultraviolet-curable resin and an apparatus therefor.

2. Description of the Related Art

Methods for producing an aspherical lens, consisting of a glass blank and a resin layer laminated thereon, are already known, as disclosed for example in the Japanese Patent Application Laid-open Nos. 60-56544 and 60-243601.

Figure 9:
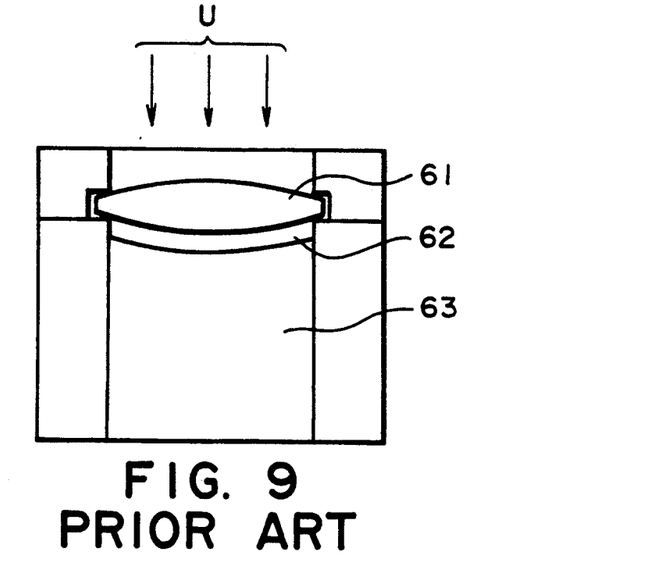
FIG. 9 is a schematic cross-sectional view of an apparatus employed in the conventional method.

FIG. 9 illustrates such conventional methods, wherein shown are a glass blank 61; a metal mold 63; an ultraviolet-curable resin layer 62; and ultraviolet light U. Ultraviolet-curable resin for forming the resin layer 62 is placed between the glass blank 61 and the metal mold 63 and is cured by the irradiation of ultraviolet light U, and the metal mold 63 is separated from the resin layer 62 to obtain a lens having the resin layer on the glass blank.

Figure 2:
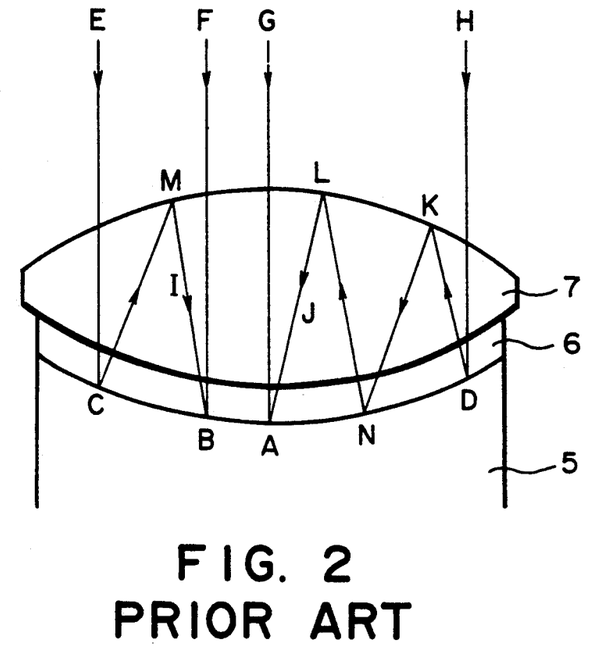
FIG. 2 is a view showing light paths in a conventional method.
Figure 3:
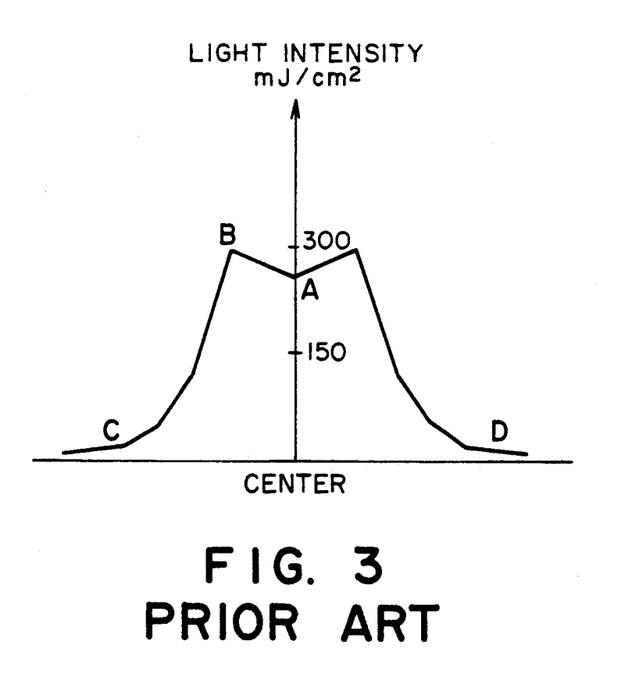
FIG. 3 is a chart showing the light intensity distribution in the conventional method.

However, in such conventional method, even if the irradiation from the light source is conducted in a uniform and parallel manner, the reflections on the faces of the metal mold and of the glass blank result in nonuniform distribution of light intensity over the lens face as shown in FIGS. 2 and 3, eventually leading to nonuniform curing speed of the ultraviolet-curable resin. As a result, since the curing is completed faster in a portion receiving a high irradiation intensity and slower in a portion receiving a low irradiation intensity, a stress is generated in the cured resin layer to deteriorate the precision of the lens face. Also, since the faster curable portion receiving higher irradiation intensity is cured with absorption of surrounding uncured resin in order to compensate for the contraction of resin resulting from curing, the slower curable portion receiving lower irradiation intensity results in a lack of the amount of resin and shows defects such as shrinkage.

SUMMARY OF THE INVENTION

In consideration of the foregoing, an object of the present invention is to provide a method for producing a lens so that the entire resin layer may be cured with uniform curing speed, thereby allowing one to obtain a lens which is free from stress generation, has excellent precision of the lens faces, and is free from defects such as shrinkage.

Another object of the present invention is to provide a method for producing an optical element such as a lens, utilizing a mold having a molding face for transferring or imparting an optically functional face of the optical element such as a lens, a glass blank, means for supplying/dropping resin to be adhered to the surface of the glass blank, and means for uniforming, that is, making uniform, an amount of irradiation made by irradiating means onto the glass blank upon adhering resin to glass blank, and comprising a step of uniforming an amount of incident energy which reaches the resin by means of the uniforming operation.

The present invention in one embodiment is to provide a lens producing method comprising the steps of dropping a droplet of ultraviolet-curable resin onto a mold having the form of a spherical or aspherical lens, and irradiating the resin with ultraviolet light, to cure the resin with a filter having different transmittances in the central and peripheral areas inserted between a light source and the mold, and to provide a lens producing apparatus comprising a lens mold having the form of a spherical or aspherical lens; an ultraviolet irradiating device positioned above or below the mold; a device for dropping a droplet of ultraviolet-curable resin onto the mold; a filter with different optical transmittances at the central and peripheral portions; and a driving device for inserting the filter between the ultraviolet irradiating device and the mold and removing the filter.

The present invention in one embodiment employs a filter with different optical transmittances in the central and peripheral portions to obtain a uniform true intensity distribution including the reflections from the faces of the mold and of the glass blank, thereby obtaining a lens of high face precision with reduced shrinkage and reduced stress generation. In addition, the filter is given a light diffusion property to render the true intensity distribution further uniform in order to further improve the precision of the lens.

DESCRIPTION OF THE PREFERRED EMBODIMENTS

Now the present invention will be clarified in detail by embodiments thereof shown in the attached drawings.

Figure 1:
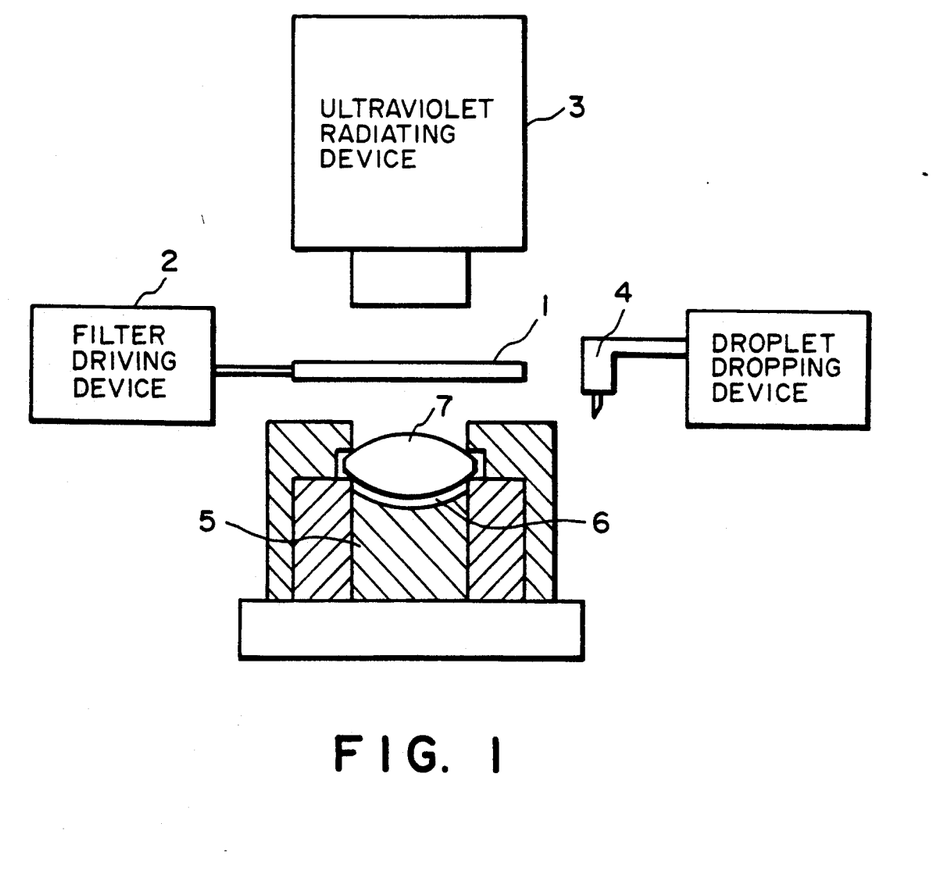
FIG. 1 is a schematic cross-sectional view of an apparatus of an embodiment according to the present invention.

FIG. 1 illustrates an example of the apparatus of the present invention, wherein shown are a filter 1 with different transmittances in the central and peripheral portions; a filter driving device 2 for inserting and retracting the filter; an ultraviolet irradiating device 3; a droplet dropping device 4 for dropping a droplet of ultraviolet-curable resin; a lens metal mold 5 of which a face is mirror finished to the final lens form; an ultraviolet-curable resin layer 6; and a glass blank 7 finished to a desired lens form.

In the following there will be explained the function of the apparatus with reference to FIG. 1. At first, a suitable amount of the ultraviolet-curable resin is dropped by the dropping device 4 into the center of the lens face of the metal mold 5. After dropping, the glass blank 7 is placed on the ultraviolet-curable resin. The ultraviolet-curable resin is interposed between the lens face of the metal mold 5 and the lower face of the glass blank 7 and is uniformly spread along the faces, thus forming the ultraviolet-curable resin layer 6. Subsequently, the filter driving unit 2 inserts the filter 1 into the space between the ultraviolet irradiating unit 3 and the glass blank 7. Irradiation with ultraviolet light is conducted while the filter is inserted. The ultraviolet light passes through the filter 1 and the glass blank 7 and reaches the resin layer 6, thereby forming a cured resin layer.

FIG. 2 shows light paths in a conventional apparatus without the above-explained filter, wherein shown are the lens metal mold 5, ultraviolet-curable resin layer 6, glass blank 7, and different positions A, B, C, D and N on the metal mold 5. The center A of the metal mold face receives not only a ray G coming directly from the ultraviolet irradiating unit but also a ray F originating with ray H falling onto the peripheral part of the metal mold face from the ultraviolet irradiating unit, after multiple reflections at positions D, N on the metal mold face and at positions K, L on the glass blank face. Also, a position B close to the center of the metal mold face receives not only a ray F coming directly from the ultraviolet irradiating unit but also a ray I originating with ray E falling on the peripheral part of the metal mold face, after multiple reflections.

FIG. 3 shows the light intensity distribution in the radial direction in the ultraviolet-curable resin layer 6 of the conventional structure shown in FIG. 2, wherein the abscissa indicates the radial position in the lens, while the ordinate indicates the light intensity in $mJ/cm^2$. As will be apparent from FIG. 3, the light intensity at the center A of the lens and the nearby position B is significantly higher than that in the peripheral positions C, D of the lens.

Figure 4:
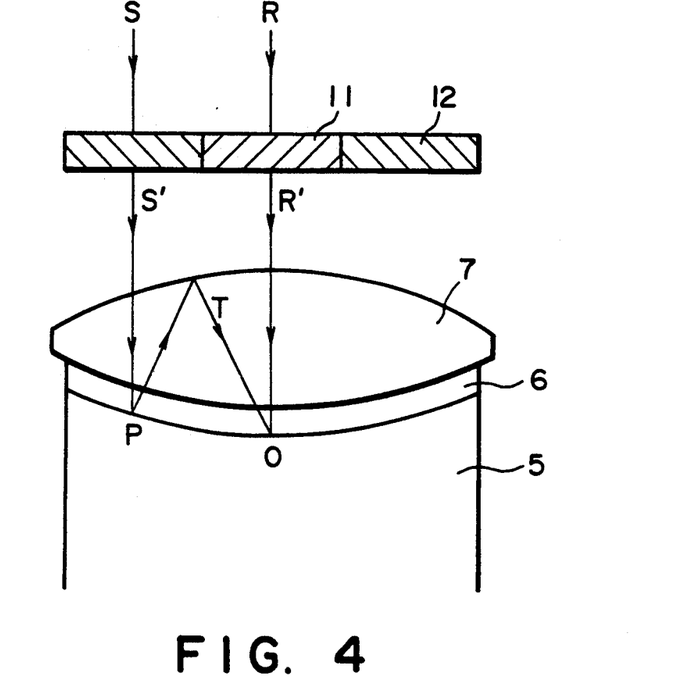
FIG. 4 is a view showing light paths in the method according to the present invention.

FIG. 4 illustrates the light paths in the method of the present invention employing the above-explained filter, wherein shown are a central portion 11 of the filter; a peripheral portion 12 of said filter; a lens metal mold 5; an ultraviolet-curable resin layer 6; a glass blank 7; and positions O, P on the lens metal mold. A ray R from the ultraviolet irradiating unit passes through the central portion 11 of the filter and reaches the center O of the metal mold face. Another ray S passes through the peripheral portion 12 of the filter and reaches a point P on the metal mold face, and a ray T reflected at point P is further reflected by the face of the glass blank and reaches the center O of the metal mold face. The light intensity before passing through the filter is:

$$R = S.$$

However, after passing through the filter, the central portion of the resin layer 6 also receives the light components resulting from multiple reflections. Therefore, according to the present invention, the transmittance of the filter in the central portion 11 is different from the transmittance of the filter in the peripheral portion 12 ($R' < S'$) in such a manner that the light intensity in the resin layer is substantially equal in the central portion and in the peripheral portion thereof, namely:

$$R' + \Sigma Ci = S'$$

wherein $\Sigma Ci$ is the sum of the light components resulting from multiple reflections.

Figure 5:
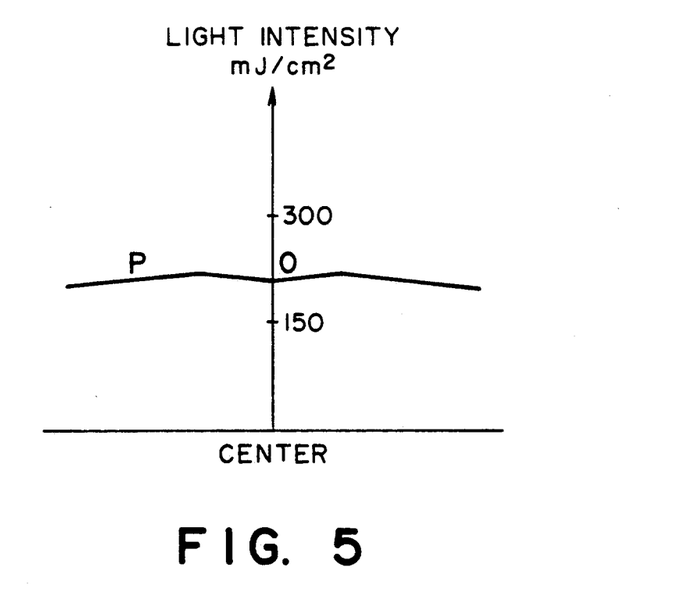
FIG. 5 is a chart showing the light intensity distribution in the method according to the present invention.

FIG. 5 shows the light intensity distribution in the radial direction in the ultraviolet-curable resin layer 6 with the filter shown in FIG. 4, wherein the ordinate indicates the light intensity in $mJ/cm^2$ while the abscissa indicates the radial position of the lens. As will be apparent from FIG. 5, the light intensity is substantially the same at the center O and peripheral position P of the lens.

Figure 6:
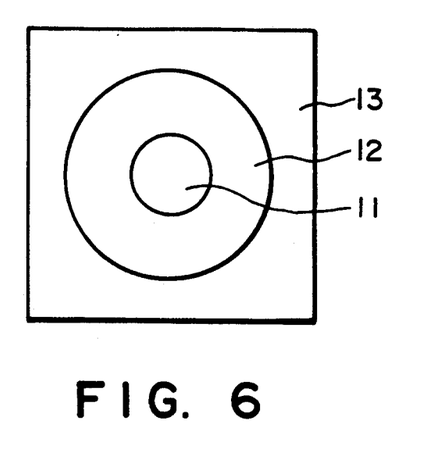
FIG. 6 is a schematic plan view, seen from above, of an example of the filter capable of being employed in the present invention.

FIG. 6 is a plan view, seen from above, of the filter employed in the present invention, wherein shown are a central portion 11, a peripheral portion 12, and a frame 13. If the metal mold is concave, the transmittance is made lower in the central portion 11 and higher in the peripheral portion 12. If the metal mold is convex, the transmittance is selected the other way. The filter shown in FIG. 6 is divided into the central and peripheral portions each having different transmittances, but it may be divided into a larger number of portions depending on the shape of the lens.

Figure 7:
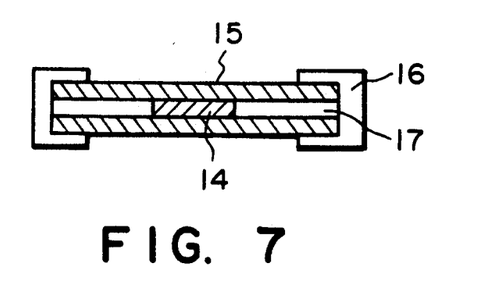
FIG. 7 is a schematic cross-sectional view showing an example of the filter capable of being employed in the present invention.

FIG. 7 illustrates a cross-sectional structure of the filter according to one embodiment of the present invention, wherein shown are a filter member 14 of a size appropriate to cover the central portion of the metal mold; a filter member 15 of a size sufficient to cover the entire metal mold; a support frame 16; and an air layer 17. FIGS. 6 and 7 illustrate only one example of the filter, and any other filter may be employed as long as the ultraviolet transmittance is different between the central portion 11 and the peripheral portion 12.

Figure 8:
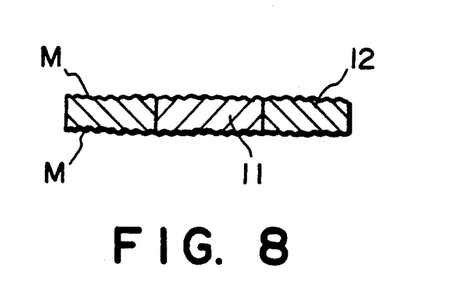
FIG. 8 is a schematic cross-sectional view showing another example of the filter capable of being employed in the present invention.

FIG. 8 illustrates a cross-sectional structure of another filter employable in the present invention. The filter has light diffusion treatment on both surfaces M of the filter shown in FIGS. 4 and 6. Instead of light diffusion treatment, light diffusion material may be incorporated in the filter material.

Table 1 compares the precision of faces of the lenses produced by the conventional method with the method of the present invention. The lens produced had a diameter of 16 mm$\phi$. The metal mold has a radius of curvature of $R = 16.25$ mm. The glass blank was a biconvex lens with $R = 16.25$ mm and $R = 20$ mm, and an ultraviolet-curable acrylic resin layer was laminated with a thickness of 30 $\mu$m on the face with $R = 16.25$ mm of the glass blank.

Figure 11:
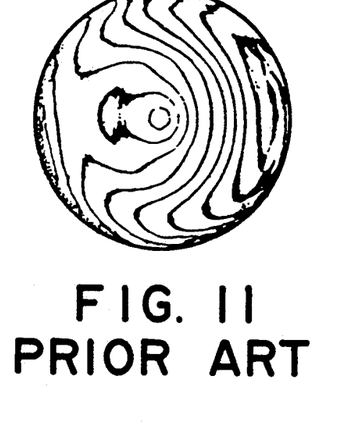
FIG. 11 is a view of Newton rings in a lens obtained with the conventional method.

The lens obtained by the conventional method showed a contour map of the surface in the center (see FIG. 11) because of the aforementioned difference in the light intensity between the central and peripheral portions. The lens produced by the conventional method can be used in applications which do not require a high precision, but cannot be used in applications requiring a high precision, such as the lens for the video camera or one interchangeable lens for a single-lens reflex camera.

Figure 12:
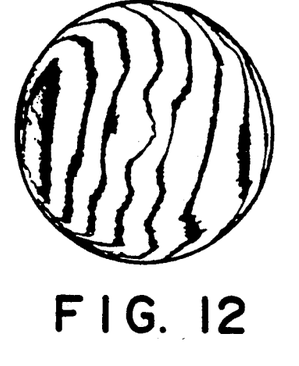
FIGS. 12 to 14 are views showing Newton rings in lenses obtained respectively with Examples 1, 2 and 3.

In Table 1, there is Example 1 in which the resin layer is formed according to one method of the present invention. The filter is composed of transparent acrylic resin plate so that an energy of 20 mW/cm$^2$ is obtained in the central portion of 10 mm$\phi$ and 30 mW/cm$^2$ in the peripheral portion of 10 to 16 mm$\phi$. When the precision of the faces of the molded lens was measured, the contour map of the surface in the central part observed in the conventional method was almost eliminated (refer to FIG. 12).

Figure 13:
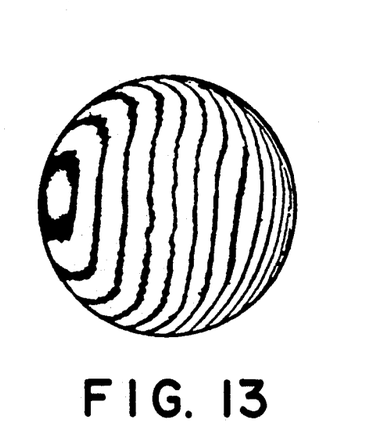

Example 2 also embodies the present invention, and was formed employing the filter of Example 1 which was, however, subjected to light diffusion matting treatment on both faces. Although the light intensities at the central and peripheral portions were maintained to be the same as those in Example 1, the molded lens showed improved precision of the lens face at the central part (refer to FIG. 13), because the light intensity distribution was made even more uniform by light diffusion on the diffusing faces.

Figure 14:
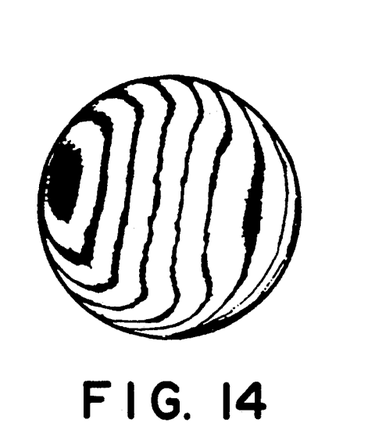

In Example 3, which also embodies the present invention, ultraviolet irradiation was conducted in two steps as explained below. In the first step the irradiation was conducted for 2 minutes, with the light diffusion filter being the same as that employed in Example 2, with light intensities of 3 mW/cm$^2$ in the central portion and 5 mW/cm$^2$ in the peripheral portion. In the second step, the irradiation was conducted for 1 minute without the diffusing filter, with a light intensity of 100 mW/cm$^2$ both in the central and peripheral portions. The obtained lens showed a satisfactory face precision the same as that in Example 2 (refer to FIG. 14), and the entire curing time was reduced from 6 minutes to 3 minutes.

As will be apparent from the results shown in Table 1, the method of the present invention allows one to produce lenses which can satisfactorily be utilized for high precision lenses such as those for video cameras or for single-lens reflex cameras.

As detailedly explained in the foregoing, the present invention allows a substantially uniform light intensity distribution in the ultraviolet-curable resin layer to be established thereby providing a highly precise lens without generation of shrinkage or stress therein.

What is claimed is:

1. A method for producing an optical element having an aspherical face and an optical axis by adhering resin to a glass blank, said method comprising the steps of:
   preparing a mold member having an aspherical molding face for imparting an aspherical face shape to an optical face formed by the resin on the glass blank;
   dropping the resin onto the aspherical molding face of the mold member;
   placing the glass blank on the resin;
   irradiating the glass blank with light, through a means for irradiating, so as to cure the resin, wherein the means for irradiating comprises ultraviolet irradiation means; and
   controlling the light energy reaching the resin, through a controlling means, so that the light energy incident at central and peripheral portions of the resin on the aspherical face of the optical element is substantially uniform, with respect to the optical axis, wherein the controlling means comprises a filter including a light intensity adjusting portion, and the filter passes ultraviolet irradiation from the ultraviolet irradiation means so that central and peripheral portions of the filter through which the ultraviolet irradiation has been transmit-

TABLE 1

|  | Conventional method | Example 1 | Example 2 | Example 3 |
|---|---|---|---|---|
| Curing condition | Irradiation 6 minutes without filter; Intensity: 30 mW/cm$^2$ over the entire area | Irradiation 6 minutes with filter; Intensity: 20 mW/cm$^2$ central portion; 30 mW/cm$^2$ peripheral portion | Irradiation 6 minutes with filter; Intensity: 20 mW/cm$^2$ central portion; 30 mW/cm$^2$ periphearl portion | Irradiation 2 minutes with diffusive filter with intensities: 3 mw/cm$^2$ central portion and 5 mW/cm$^2$ peripheral portion; and irradiation 1 minute without filter intensity: 100 mW/cm$^2$ over the entire area |
| Face precision | Central 3 N Peripheral 2 N Contour map of the surface in the center | Central 0.8 N Peripheral 1.5 N Almost no contour map of the surface in the center | Central 0.2 N Peripheral 1.2 N Almost no contour map of the surface in the center | Central 0.2 N Peripheral 2 N Almost no contour map of the surface in the center |
| Drawing | FIG. 11 | FIG. 12 | FIG. 13 | FIG. 14 |

Figure 10:
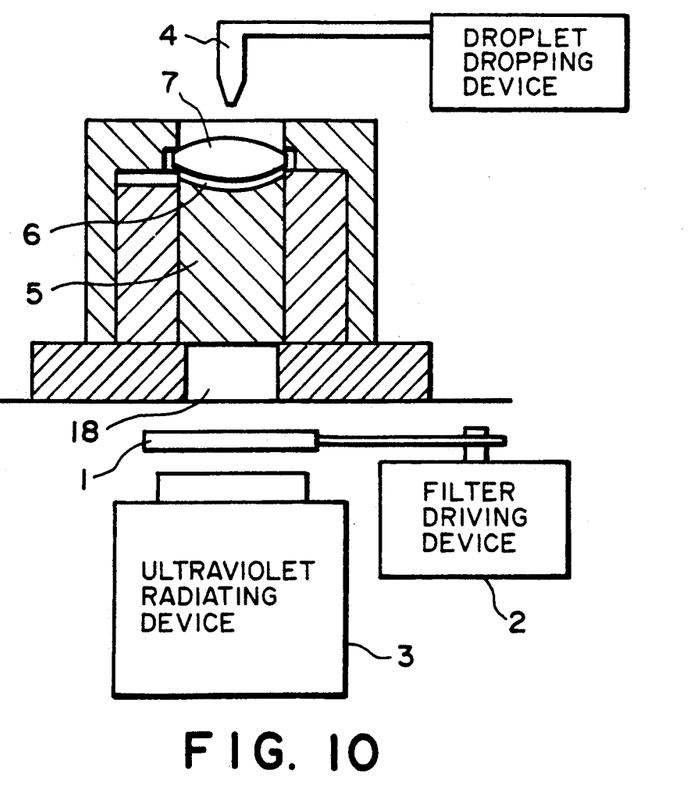
FIG. 10 is a schematic cross-sectional view of an apparatus of another embodiment according to the present invention.

FIG. 10 shows another embodiment, in which the lens mold is provided with an aperture 18. The ultraviolet light emitted from an ultraviolet irradiating unit 3 passes through a filter 1 having different transmittances in the central and peripheral portions, then enters the aperture 18 and the interior of a lens mold 5 made of a light-transmitting material such as quartz and reaches an ultraviolet-curable resin layer 6. The ultraviolet irradiation through the mold enables the influence of multiple reflections to be reduced.

ted will satisfy the following relationship:

$$R' + \Sigma C_1 \approx S'$$

where $R'$ is a light intensity at the resin that is transmitted at the central portion,
$\sigma C_1$ is a sum of light component intensities at the central portion of the resin resulting from multiple reflections, and
$S'$ is a light intensity at the resin that is transmitted at the peripheral portion.

* * * * *

UNITED STATES PATENT AND TRADEMARK OFFICE
CERTIFICATE OF CORRECTION

PATENT NO. : 5,269,867
DATED : December 14, 1993
INVENTOR(S) : TAKASHI ARAI

It is certified that error appears in the above-indentified patent and that said Letters Patent is hereby corrected as shown below:

COLUMN 1
```
    Line 4, delete "p 1. Field";
    Line 5, "of the invention" should read
            --1. Field of the invention--;
         59, "resin" should read --the resin--;
         60, "glass" should read --the glass--; and
         67, "light," should read --light--.
```

COLUMN 2
```
    Line 2, "and to" should read --and also, to--.
```

COLUMN 3
```
    Line 24, "ray F" should read -- ray J,--.
```

COLUMN 5
```
    Table 1, Under Example 2: "periphearl" should read
            --peripheral--.
```

COLUMN 6
```
    Line 4, "established" should read --established,--; and
    Line 58, "σC_1" should read --ΣC_1--.
```

Signed and Sealed this

Second Day of August, 1994

Attest:

BRUCE LEHMAN

Attesting Officer     Commissioner of Patents and Trademarks